United States Patent Office 3,553,277
Patented Jan. 5, 1971

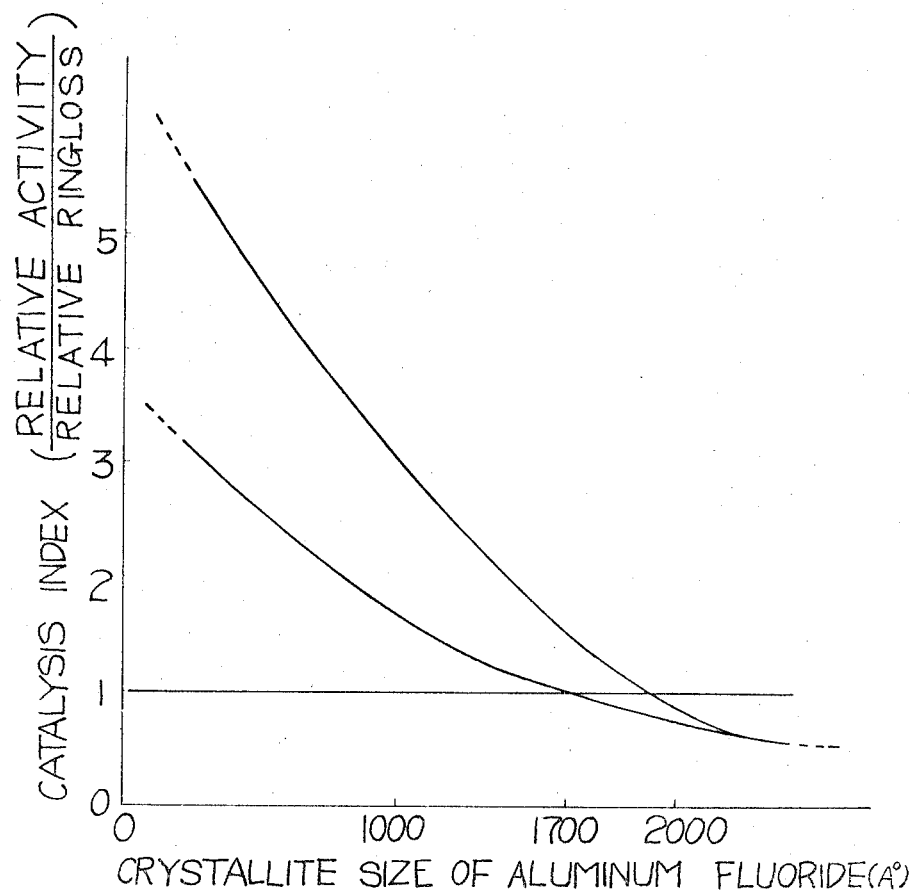

3,553,277
METHOD OF THE DISPROPORTIONATION OF TOLUENE
Masaki Sato, Kamakura-shi, and Seiya Otani, Ohtsu-shi, Japan, assignors to Toyo Rayon Kabushiki Kaisha, Tokyo, Japan, a corporation of Japan
Filed Dec. 5, 1968, Ser. No. 781,507
Claims priority, application Japan, Dec. 7, 1967, 42/78,196
Int. Cl. B01j *11/78;* C01b *33/28;* C07c *3/58*
U.S. Cl. 260—672        17 Claims

ABSTRACT OF THE DISCLOSURE

A method of the preparation of benzene and xylene by the disproportionation of toluene by contacting toluene in the presence of hydrogen under heating with a catalyst which is prepared by mixing a dealkalized mordenite with an aluminum fluoride having a crystallite size of less than 1700 A. before the mixing for the preparation of the catalyst. The catalyst may contain copper or silver as the third component.

---

Figure 1:
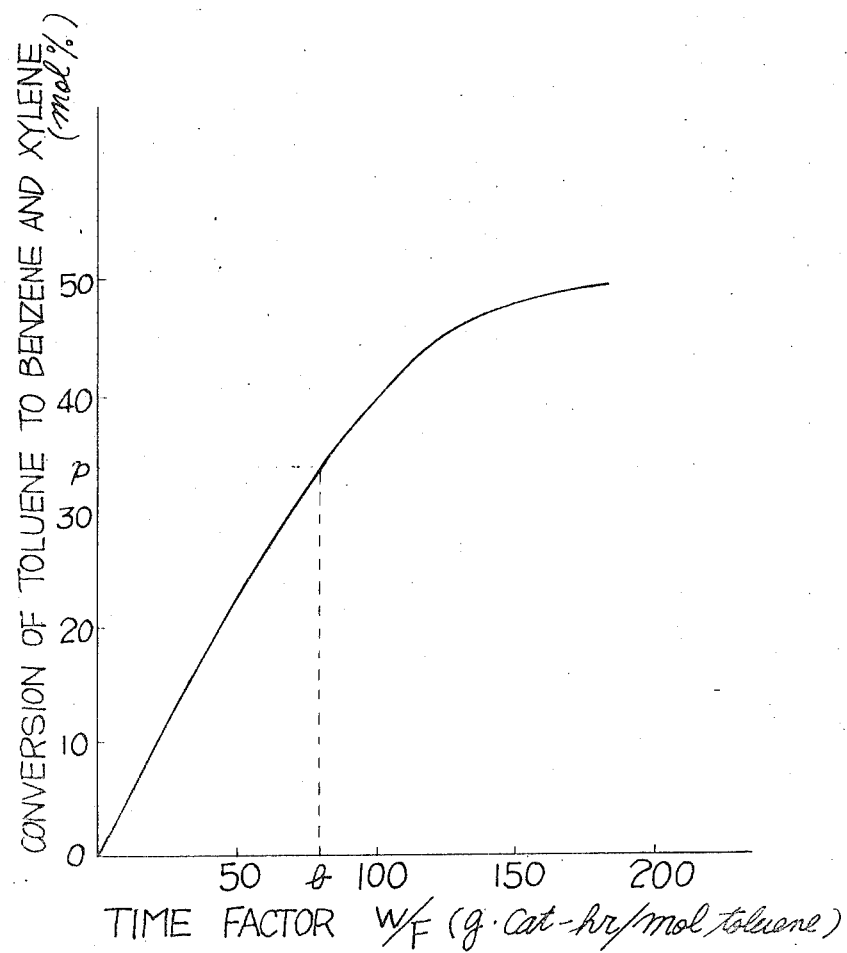

This invention relates to the disproportionation of toluene to benzene and xylene by demethylating a part of toluene and concurrently methylating another part of toluene by the vapor-phase catalytic heterogeneous reaction.

Recently, with the increase of the productions of synthetic fibers, particularly polyester and polyamide type synthetic fibers, demand for benzene and xylene has been increased. Therefore, the so-called disproportionation process for converting toluene to benzene and xylene had been industrially examined in various ways. With reference to alkyl aromatic hydrocarbons, various disproportionation processes have been proposed heretofore. Most of these processes use Friedel-Crafts catalysts. Further, there have been reported other various processes using as catalyst silica-alumina, alumina-boria, or crystalline zeolite known as molecular sieve.

However, all of these known catalysts exhibit only a low catalytic activity to the disproportionation reaction of toluene and further, they have shortcomings such as a short life and an extreme deposition of carbon on the catalyst. Therefore, any of these known catalysts cannot be a sufficient catalyst usable for the industrial disproportionation of toluene.

In view of such state of the art, we have made various attempts to develop novel catalysts which are capable of disproportionating toluene with high conversion and yield, have a long life and are greatly improved with respect to the deposition of unnecessary carbon. As a result we have found novel disproportionation catalysts excellent in the catalytic activity and arrived at this invention.

This invention provides a process for the preparation of benzene and xylene by the disproportionation of toluene comprising contacting toluene with a catalytic amount of a catalyst under heating, characterized in that the catalyst is prepared by mixing a dealkalized mordenite with an aluminum fluoride, the said aluminum fluoride having a crystallite size of less than 1700 A. before the mixing for the preparation of the catalyst and that the said disproportionation is carried out in the presence of hydrogen.

This invention provides also a process for the preparation of benzene and xylene by the disproportionation of toluene comprising contacting toluene with a catalytic amount of a catalyst under heating, characterized in that the catalyst is prepared by mixing a dealkalized mordenite and, an aluminum fluoride with at least one member selected from the group consisting of copper and silver, the said aluminum fluoride having a crystallite size of less than 1700° A. before the mixing for the preparation of the catalyst and that the said disproportionation reaction is carried out in the presence of hydrogen.

FIG. 1 is a graph illustrating the relation between the time factor $(W/F)$ and the conversion of toluene to benzene and xylene when the disproportionation of toluene is performed by employing the standard catalyst consisting only of a dealkalized mordenite. FIG. 2 is a graph illustrating the catalytic properties of the catalyst of this invention and the above mentioned standard catalyst.

The term "mordenite" used in the specification and claims of this invention means a kind of zeolite which consists predominantly of a crystalline, hydrated alkali metal or alkaline earth metal aluminosilicate and which imparts a characteristic spectrum in the vicinity of $2\theta=13.4$, 25.6 and 25.7 in the X-ray diffraction spectrum by the CuK$\alpha$ line.

The mordenite used in this invention involves either natural of synthesized mordenites. As the natural mordenite there are cited mordenites produced in Tenei-mura, Fukushima-prefecture, Japan; Shiraishi city, Miyagi-prefecture, Japan; or in Nova Scotia, U.S.A.

Crystalline zeolites known as molecular sieve have been conventionally used as catalysts for the disproportionation of hydrocarbons by cracking or alkylation. In the conventional methods employing such crystalline zeolites, it is required that the catalysts should have a uniform porous structure, and the catalytic activity of these catalysts was deemed to be due to such porous structure. On the other hand, it must be noted that the mordenite to be used in this invention should not always have a uniform porous structure.

The dealkalized mordenite, the first component of the catalyst of this invention is obtained by subjecting the above described mordenite to a dealkalizing treatment. The dealkalizing treatment referred to herein means a treatment of substituting alkali metals or alkaline earth metals contained in the mordenite by hydrogen. The degree of the dealkalization can be measured by the conventional analytical means such as atomic adsorption spectrophotometry. With reference to the degree of the dealkalization in the dealkalized mordenite of the catalyst of this invention, more than 50 mol percent, preferably more than 90 mol percent of the whole alkali metals and alkaline earth metals contained in an untreated mordenite are substituted by hydrogen. The dealkalizing treatment is performed by pulverizing a mordenite according to need, treating it with an aqueous solution of 1–6 N of an inorganic acid such as hydrochloric acid, sulfuric acid, nitric acid and phosphoric acid, or an organic acid such as formic acid and acetic acid, and thereby substituting alkali metals or alkaline earth metals directly by hydrogen. In this case, the treatment may be performed at room temperature, but it is preferred to carry out the treatment at elevated temperatures of 80 to 100° C. The treating time varies depending on the treating temperature and the concentration of the treating aqueous solution, but generally, it is in the range of from 1 to 6 days. The other preferred method of the dealkalizing treatment comprises pulverizing a mordenite according to need, treating it with an aqueous solution of an ammonium compound such as ammonium chloride or ammonium nitrate having a concentration of 1 to 30% by weight, preferably 5 to 15% by weight, to substitute alkali metals or alkaline earth metals by NH$_4{}^+$, and thereafter subjecting the so treated mordenite to a heat treatment at 300 to 650° C. to form the hydrogen-substituted product by removal of ammonia. The treatment with such ammonium compound aqueous solution may be performed at room temperature, but it is preferred to carry out the treatment at 80 to 100° C. A preferred treating time is in the range of from 1 to 6 days. This method is also preferably applied to the dealkalizing treatment. As the dealkalizing agent to be used in this invention particularly preferably are hydrochloric acid, nitric acid and ammonium chloride. The mordenite treated with an aqueous solution of the dealkalizing agent is then washed with water sufficiently, dried at 120 to 150° C. and blended with an aluminum fluoride.

The aluminum fluoride, the second component of the catalyst of this invention should have a crystallite size of less than 1700 A. before the mixing for the preparation of the catalyst. The crystallite size of the aluminum fluoride referred to in the specification and claims of this invention is defined as the value measured by the following method. The diffraction of the wide-angle X-ray is performed by the crystal of the sample aluminum fluoride. In the equatorial line interference of the resulting X-ray diffraction pattern, the diffraction intensity in the vicinity of the peak at the diffraction angle of $2\theta = 25.2° \pm 0.3°$ is measured. The crystallite size of the aluminum fluoride is defined as the value D calculated from the half value width of the diffraction intensity curve in accordance with Scherrer's equation;

$$D = \frac{K\lambda}{\beta \cos \theta}$$

wherein $\lambda$ is a half value width of the diffraction intensity curve which varies depending on the crystallite size,
$\beta$ is a wavelength of the X-ray,
K is a constant (0.9), and
$\theta$ is a diffraction angle.

The above restriction of crystallite size is given to an aluminum fluoride before the mixing for the preparation of the catalyst of this invention, and it must be noted that the above restriction does not specify the crystallite size after the preparation of the catalyst.

Any aluminum fluoride may be used in the process of this invention, as far as it has a crystallite size of less than 1700 A. For instance, aluminum trifluoride hydrates prepared in accordance with the methods described in E. Band Am. Chem. Phys., (8) 1, 60 (1904), A. Mazzuchelli, Atti Accad Lincei, (5) 16i, 775 (1907) and W. F. Fhret, F. T. Frere, J. Am. Chem. Soc., 67, 64 (1945), and basic aluminum fluorides represented by the formula $Al(OH)_l F_m O_n$ (wherein $l+m+2n=3$, $l=2.7-0.20$, $m=0.30-2.70$ and $n=1.2-0.0$) and prepared in accordance with the methods described in J. M. Cowley, T. R. Scott, J. Am. Chem. Soc., 70, 105 (1948) and R. L. Johnson, B. Siegel, Nature 210, 1256 (1966) are preferably used. As the second component of the catalyst of this invention preferably employed are aluminum fluorides prepared by calcining $\alpha\text{-}AlF_3 \cdot 3H_2O$, $\beta AlF_3 \cdot 3H_2O$ or a mixture thereof at a temperature below 700° C., preferably in the range of from 200 to 500° C. Similarly effective alumina fluorides are also obtained by passing excess of anhydrous hydrogen fluoride through a reaction column packed with alumina, aluminum hydroxide or a mixture thereof at 200 to 500° C. or by passing excess of anhydrous hydrogen fluoride through a reaction column packed with aluminum chloride at 20 to 400° C.

In case such aluminum fluoride is used as one component of the catalyst of this invention, it is unnecessary to use an aluminum fluoride of a uniform chemical structure and catalytic effects can be likewise attained even by use of mixtures of the above cited aluminum fluorides, as far as the crystallite size thereof is less than 1700 A.

It is essential that the catalyst of this invention should comprise at least the above described first and second components. As is shown in examples described hereinbelow, the disproportionation of toluene cannot be sufficiently performed when either of the above components is not contained in the catalyst. Though it is indefinite which of the two components acts as the main catalyst component in the catalyst of this invention, when an aluminum fluoride meeting the requirements specified in this invention is made coexistent with the dealkalized mordenite, the catalytic activity of the system is extremely heightened as compared with the conventional catalyst systems, occurrence of undesired side reactions is reduced and further the catalyst life is greatly prolonged.

In addition to the above described two components, the catalyst of this invention may contain at least one member selected from copper and silver as the third component. Copper and/or silver does not exhibit any catalytic activity to the disproportionation reaction of toluene when used singly. However, when copper and/or silver is added as the third component to the dealkalized mordenite and aluminum fluoride, the catalytic activity for the disproportionation is heightened as compared with the catalyst consisting of two components alone, the decomposition of toluene is reduced and hence, amounts of carbon materials deposited on the catalyst are decreased. In addtion, the catalyst life is further prolonged by the addition of copper and/or silver. Copper and/or silver is generally added in a form of a metal salt such as nitrates or chlorides. For instance, silver nitrate, cupric nitrate and cupric chloride are used.

The composition of the catalyst to be used in the process of this invention varies depending on the reaction conditions, but generally, in the case of the two-component catalyst, the composition is 20 to 99% by weight, preferably 40 to 90% by weight, of the dealkalized mordenite component and 1 to 80% by weight, preferably 10 to 60% by weight, of the aluminum fluoride component. In the case of the three-component catalyst, the metallic component consisting of copper and/or silver is added to the above two-component catalyst in an amount of 0.05 to 30% by weight based on the above two-component catalyst. In case only copper is added, its preferred ratio is 5 to 10% by weight, and in case only silver is added, it is preferred to use it in an amount of 2 to 8% by weight.

The characteristic features of the invention process for the disproportionation of toluene employing the catalyst of the above composition will be detailed hereinbelow.

Generally speaking, in the disproportionation of toluene a side reaction such as cracking of toluene or the resulting product is caused to occur, and the formation of lower hydrocarbons and the deposition of carbon materials are observed. In the specification of this invention, the ringloss is expressed in terms of the value (percent by weight) obtained by determining the amount formed of lower hydrocarbons contained in the purge gas by the customary gas chromatography and dividing the weight of the carbon contained in the lower hydrocarbons formed by the weight of the carbon contained in the toluene feed. This value indicates the degree of occurrence of the side reaction. In the specification of this invention, the quality of a cataylst used in the disproportionation is evaluated based on a combination of the highness of the catalytic actvity and the easiness of occurrence of the side reaction, and as the criterion for evaluating the quality of the catalyst there is adopted the value of "catalysis index" defined as being the value obtained by dividing the value of "relative activity" of the catalyst by the value of "relative ringloss." The values of "relative activity" and "relative ringloss" referred to here in were calculated in accordance with the following procedures.

The standard catalyst of dealkalizing degree of 93 mol percent was prepared by treating a mordenite produced in Fukushima prefecture, Japan with a 6 N aqueous solution of hydrochloric acid, washing it with water, drying it and subjecting it to a heat treatment at 500° C. By employing the so prepared standard catalyst, the disproportionation of toluene was conducted under the following reaction conditions:

Reaction temperature: 450° C.
Reaction pressure: 30 kg./cm.$^2$
Time factor W/Fs 100 g. cat. hr./mol toluene (wherein
 W is the weight of the catalyst and F is the toluene feed rate (mol/hr.)]

As a result, the conversion of toluene to benzene and xylene was 37 mol percent and the ringloss was 1.42% by weight. These values were selected as standard values of the conversion and ringloss, respectively. The results shown in Table 1 were obtained by carrying out the disproportion of toluene at a temperature of 450° C. and a pressure of 30 kg./cm.$^2$ in the presence of the standard catalyst while changing the time factor of $W/F$ variously and measuring the value of the conversion of toluene to benzene and xylene in each case.

TABLE 1

Relation between the time factor $W/F$ of the standard catalyst and the conversion of toluene to benzene and xylene (450° C.; 30 kg./cm.$^2$)

| Time factor $W/F$ (g. cat. hr./mol toluene) | Conversion of toluene to benzene and xylene (mol percent) |
| --- | --- |
| 50 | 22.5 |
| 70 | 30 |
| 100 | 40 |
| 130 | 46 |
| 180 | 49.5 |

The curve shown in FIG. 1 was obtained by plotting on a graph the relation between the time factor $W/F$ and the conversion of toluene to benzene and xylene. As will be described hereinbelow, this curve is used as a reference curve for calculating the value of the "relative activity."

By employing an optional sample catalyst, the disproportionation of toluene is carried out at a temperature of 450° C. and a pressure of 30 kg./cm.$^2$ under a prescribed value $a$ (g. cat. hr./mol toluene) of the time factor $W/F$, and then the conversion of toluene to benzene and xylene is measured. If the measured value of the conversion is $p$ mol percent, the value of the time factor $W/F$ corresponding to the conversion of $p$ mol percent is sought in the curve of FIG. 1. If the value of the time factor $W/F$ is $b$ (g. cat. hr./mol toluene), then the value of the relative activity is given by the following equation:

$$\text{Relative activity} = \frac{100 \times b}{a}$$

By employing the same sample catalyst, the disproportionation of toluene is performed at a temperature of 450° C. and a pressure of 30 kg./cm.$^2$ while the value of the time factor $W/F$ is so selected that the conversion of toluene to benzene and xylene will be 40 mol percent, and then the ringloss is measured. If the measured value of the ringloss is C percent by weight, then the value of the relative ringloss is given by the following equation:

$$\text{Relative ringloss} = 100 \times C/1.42$$

The great value of the catalysis index means that the catalyst is excellent in catalytic activities. As the value of the relative activity is great, the value of the catalysis index is great, and as the value of the relative ringloss is small, the value of the catalysis index is great.

The crystallite size of the aluminum fluoride to be used as one component of the catalyst of this invention is in a close relation to the catalytic activity and ringloss. As the crystallite size increases, the catalytic activity tends to decrease and the ringloss tends to increase.

FIG. 2 shows instances of the relation between the catalysis index and the crystallite size of the aluminum fluoride in the catalyst of this invention. The curve $a$ shows the catalysis index of the standard catalyst consisting of 100% by weight of mordenite treated with hydrochloric acid. The curve $b$ shows the catalysis index of a catalyst consisting of 20% by weight of aluminum fluoride and 80% by weight of mordenite treated with hydrochloric acid. The curve $c$ shows the catalysis index of a catalyst consisting of the above catalyst of curve $b$ and 5% by weight, based on said catalyst of curve $b$, of copper.

As is apparent from FIG. 2, in case an aluminum fluoride having a crystallite size of less than 1700 A. is used as one component of the catalyst of this invention, the catalyst exhibits a higher catalysis index than the standard catalyst consisting of the dealkalized mordenite alone. On the other hand, in case an aluminum fluoride having a crystallite size of greater than 1700 A., the catalyst exhibits a catalysis index equivalent or rather inferior to that of the standard catalyst. Accordingly, it is an indispensable requirement that the aluminum fluoride to be used as one component of the catalyst of this invention should have a crystallite size of less than 1700 A.

The preparation of the catalyst of this invention will be explained hereinbelow.

In the case of the two-component catalyst, the preparation is performed by mixing a dealkalized mordenite with an aluminum fluoride at a suitable mixing ratio, optionally shaping the mixture into pellets by employing a suitable means, for instance, a tablet machine, and thereafter calcining the mixture. In the case of the three-component catalyst, the preparation of the catalyst is performed by adding a mixture of a dealkalized mordenite with an aluminum fluoride into an aqueous solution of a copper salt and/or silver salt to thereby impregnate the mixture with the aqueous solution, drying the mixture, optionally shaping it into pellets and thereafter calcining the mixture, whereby the third component consisting of copper and/or silver can be supported on the catalyst.

The calcination is generally performed in the air, but it is, of course, possible to carry out the calcination in an atmosphere of an inert gas such as nitrogen gas and carbon dioxide gas, or hydrogen gas. As the salt of copper or silver, it is possible to use various salts, but preferable results are obtained by the use of nitrates and chlorides, particularly nitrates. Of course, it goes without saying that other salts may be used. In this invention, the order of the steps of the preparation of the catalyst is not restricted to the above described orders alone, but it may be optionally varied.

In addition to the above described impregnating method, an ion-exchanging method is effective as the method of supporting copper and/or silver on the catalyst. This ion-exchanging method is easily conducted by treating a dealkalized mordenite with aqueous solutions of desired copper and/or silver salts, removing the dealkalized mordenite from the aqueous solution, drying it, and then mixing it with an aluminum fluoride. Also preferable is a method comprising treating a mordenite with an aqueous acid solution containing desired metal cations and thereby concurrently carrying out the dealkalization of the mordenite and the supporting of the metal components. In addition to the above described methods, the coventional methods such as the precipitating method, the mixing method and other known metal-supporting methods are equally applicable to this invention.

Another component may be further added to the catalyst system of this invention, so far as it is not concerned with the essence of the reaction of this invention, and this feature is not deviated from the scope of this invention.

The calcination is conducted at a temperature of from 400 to 600° C., preferably from 450 to 550° C. The calcination time of more than 4 hours is usually preferred. It is usually preferred that pellets have a diameter of from about 3 to about 6 mm.

The disproportionation of toluene employing the so prepared catalyst may be carried out in the vapor or liquid phase in accordance with known fluidized bed methods or fixed bed methods, or other known methods. In view of the easiness in operation and the like, it is optimum to carry out the reaction in the vapor phase by employing a fixed bed. The reaction is conducted at a temperature of from 300 to 700° C., preferably from 350 to 550° C. The reaction is, of course, allowed to advance at temperatures higher than 700° C., but in such case the lowering in activity of the catalyst is frequently caused to occur. The reaction of this invention can be achieved by the co-existence of hydrogen gas. The hydrogen exhibits predominantly an effect of reducing amounts deposited of carbon materials. No particular restriction is given to the amount added of hydrogen, and a sufficient effect can be attained by having hydrogen present in the system in an amount of less than 50 mols per mol of toluene. A preferred mol ratio of hydrogen; toluene is in the range of from 10:1 to 20:1. Since the catalyst of this invention exhibits a very high activity to the disproportionation of toluene, the reaction is allowed to advance even under atmospheric pressure, but in the case of the industrial operation it is preferred to carry out the reaction under elevated pressures. A preferred reaction pressure is below 100 atmospheres, and a pressure of about 30 atmospheres is optimum. No particular restriction is given to the time factor $W/F$ (g. cat. hr./mol toluene) (wherein W is the weight of the catalyst and F is an amount fed of toluene), which defines the feed rate of toluene per unit weight of the catalyst. In order to obtain a high conversion of toluene it is preferred to carry out the reaction at a $W/F$ value of from about 50 to about 400, particularly from 100 to 200. But, no disadvantage is brought about when the reaction is carried out at a $W/F$ value of below 50.

The process of this invention will be specifically described hereinbelow by referring to examples, but the scope of this invention is not limited by these examples at all.

EXAMPLE 1

A natural mordenite (produced in Fukushima prefecture, Japan) was pulverized to form particles of less than 100 meshes and treated with a 6 N aqueous solution of hydrochloric acid at 90–100° C. for 6 days, following which the so treated mordenite was washed sufficiently with water and dried for 8 hours at 120–150° C. The dealkalization degree was 93 mol percent. An aluminum trifluoride having a crystallite size of 350 A. was added to the above dealkalized mordenite in an amount of 20% by weight based on the total weight, and they were mixed together. The mixture was shaped into pellets of 5 x 5 mm. $\phi$ by employing a tablet machine and calcined at 500° C. for 8 hours. The so obtained catalyst was named as catalyst A.

The catalyst A was dipped in a 5 weight percent aqueous solution of copper nitrate to have copper nitrate supported on the catalyst A in an amount of 5% by weight, calculated in terms of copper metal, based on the catalyst A, followed by drying at 120–150° C. for 8 hours and calcining at 500° C. for 8 hours. The so obtained catalyst was named as catalyst B.

By employing 21.8 g. each of the so obtained catalysts A and B, respectively, the disproportionation of toluene was performed for 8 hours under the following conditions:

Recation pressure: 30 kg./cm.$^2$
Reaction temperature: 450° C.
Feed rate of hydrogen: 97 N–l./hr. [N–l. is a unit for a value (liter) converted under conditions of 760 mm. Hg and 0° C.]
Feed rate of toluene: 20.1 g./hr.
Mol ratio of hydrogen to toluene: 20
Time factor ($W/F$): 100 g. cat. hr./mol toluene The results are shown in Table 2 below.

TABLE 2

| Catalyst: | Conversion to benzene and xylene (mol percent) | Relative ringloss | Catalysis index |
|---|---|---|---|
| A | 41–42 | 36 | 2.9 |
| B | 47–48 | 29 | 5.1 |

From the results given in Table 2 it is evident that the catalysts to be used in this invention are very excellent in catalytic properties.

When the catalyst A was continuously used for 30 days by performing the regeneration every three days by calcination at 500–600° C. in the air, or when the catalyst B was continuously used for 50 days by performing the same regeneration every 7 days, there was hardly observed any lowering of the catalytic activity in each case.

EXAMPLE 2

Catalysts C and D were prepared in the same manner as in the case of the preparation of catalysts A and B of Example 1 except that an aluminum trifluoride having a crystallite size of 1350 A. was used instead of the aluminum trifluoride having a crystalline size of 350 A. By employing the so prepared catalysts C and D, respectively, the disproportionation of toluene was performed under the same conditions as in Example 1. The results are shown in Table 3.

TABLE 3

| Catalyst: | Conversion of toluene to benzene and xylene (mol percent) | Relative ringloss | Catalysis index |
|---|---|---|---|
| C | 33–34 | 65 | 1.2 |
| D | 37–38 | 41 | 2.1 |

Control 1

By employing a catalyst prepared in the same manner as in the case of the preparation of the catalyst B of Example 1 except using the dealkalized mordenite free of the aluminum trifluoride component instead of the catalyst A, the disproportionation of toluene was conducted under the same conditions as in Example 1. The conversion of toluene to benzene and xylene was 42–44 mol percent, the ringloss being 122 and the catalysis index being 0.75. As is apparent from these results, the copper-mordenite catalyst is inferior to the catalysts of this invention in respect of the catalysis index.

Control 2

By employing as a catalyst the dealkalized natural mordenite obtained in Example 1 alone instead of the catalyst of this invention, the disproportionation of toluene was carried out under the same conditions as in Example 1. The conversion of toluene to benzene and xylene was 40 mol percent, the relative ringloss being 100 and the catalysis index being 1.00.

EXAMPLE 3

A natural mordenite (produced in Fukushima prefecture, Japan was pulverized to particles of less than 60 meshes, and treated with a 3 N aqueous solution of nitric acid at 90–100° C. for 6 days, following which the so treated mordenite was sufficiently washed with water and dried at 120–150° C. for 8 hours. The dealkalization degree of the so treated mordenite was 94 mol percent. An aluminum trifluoride having a crystallite size of 1300 A. was added to the so treated mordenite in an amount of 15% by weight based on the total weight, and they were mixed together. The mixture was shaped into pellets of 5 x 5 mm. $\phi$ and calcined at 500° C. for 8 hours. The calcined product was dipped into a 3 weight percent aqueous solution of copper nitrate to have copper nitrate supported on the calcined product in an amount of 3% by weight, calculated in terms of copper metal, based on the dealkalized mordenite and aluminum trifluoride components, followed by drying at 120–150° C. for 8 hours and calcining at 500° C. for 8 hours.

By employing 17.4 g. of the so obtained catalyst the disproportionation of toluene was carried out for 8 hours at a pressure of 30 kg./cm.$^2$, a temperature of 450° C., a hydrogen feed rate of 97 N–l./hr., a toluene feed rate of 20.1 g./hr., a hydrogen-to-toluene mol ratio of 20 and a time factor $W/F$ of 80 g. cat. hr./mol toluene. The conversion of toluene to benzene and xylene was 37–38 mol percent, the relative ringloss being 45 and the catalysis index being 2.06.

EXAMPLE 4

A natural mordenite (produced in Fukushima prefecture, Japan) was pulverized to particles of less than 100 meshes, and treated with a 3 N aqueous solution of hydrochloric acid at 50–60° C. for 6 days, following which the so treated mordenite was washed sufficiently with water and dried at 120–150° C. for 8 hours to obtain a dealkalized mordenite having a dealkalization degree of 94 mol percent. An aluminum trifluoride having a crystallite size of 600 A. was added to the so dealkalized mordenite in an amount of 20% by weight based on the total weight and they were mixed together. The mixture was shaped into pellets of 5 x 5 mm. $\phi$ and calcined at 500° C. for 8 hours. The calcined product was dipped into a 3 weight percent aqueous solution of silver nitrate to have silver nitrate supported in an amount of 3% by weight, calculated in terms of silver metal, based on the dealkalized mordenite and aluminum trifluoride components, followed by drying at 120–150° C. for 8 hours and calcining at 500° C. for 8 hours.

By employing 17.4 g. of the so obtained catalyst, the disproportionation of toluene was carried out for 8 hours at a reaction temperature of 450° C., a pressure of 30 kg./cm.$^2$, a hydrogen feed rate of 97–l./hr., a toluene feed rate of 20.1 g./hr., a hydrogen-to-toluene mol ratio of 20 and a time factor $W/F$ of 80 g. cat. hr./mol toluene. The conversion of toluene to benzene and xylene was 47–48 mol percent, the ringloss being 30 and the catalysis index being 4.9.

By employing the same catalyst, the disproportionation of toluene was conducted under the same conditions as in the above except that the reaction temperature was adjusted to 410° C. The conversion of toluene to benzene and xylene was 41–42 mol percent.

Control 3

Two control catalysts were prepared in the same manner as in the case of the preparation of the catalyst of Example 4 except employing zinc fluoride and nickel fluoride, respectively instead of the aluminum trifluoride component and using a 5 weight percent aqueous solution of copper nitrate to have copper nitrate supported in an amount of 5% by weight, calculated in terms of copper metal, based on the dealkalized mordenite and metal fluoride components, followed by drying at 120–150° C. for 8 hours and calcining at 500° C. for 8 hours. By employing 21.8 g. each of these control catalysts, respectively, the disproportionation of toluene was conducted for 8 hours under the same conditions as in Example 1. The results are shown in Table 4.

TABLE 4

| Fluoride in catalyst: | Conversion of toluene to benzene and xylene (mol percent) | Relative ringloss |
|---|---|---|
| Zinc fluoride | 42–43 | 185 |
| Nickel fluoride | 20–23 | 4,000 |

From the results given in Table 3 it is evident that the ringloss of each of the control catalysts is very high and such catalysts are not comparable to the catalysts of this invention.

Control 4

A control catalyst was prepared in the same manner as in the case of the preparation of the catalyst of Control 3 except adding NH$_4$F:HF as the fluoride component in an amount of 13% by weight based on the dealkalized mordenite and fluoride components. When the disproportionation of toluene was carried out under the same conditions as in Example 1 by employing the so obtained control catalyst, the conversion of toluene to benzene and xylene was 28 mol percent, the relative ringloss being 17. Though this control catalyst exhibited such low value of the ringloss, it could not be used efficiently as the catalyst for the disproportionation of toluene because of its low catalytic activity.

EXAMPLE 5

A natural mordenite (produced in Miyagi prefecture, Japan) was pulverized to particles of less than 100 meshes, and treated with a 10% aqueous solution of ammonium chloride at 90–100° C. for 2 days, following which the so treated mordenite was washed sufficiently with water and dried at 120–150° C. for 8 hours to obtain a dealkalized mordenite having a dealkalization degree of 93 mol percent. An aluminum trifluoride having a crystallite size of 1000 A. was mixed with the so dealkalized mordenite in an amount of 20% by weight based on the total weight. The mixture was shaped into pellets of 5 x 5 mm. $\phi$ and calcined at 500° C. for 8 hours. The so calcined product was dipped into a 5 weight percent aqueous solution of copper nitrate to have copper nitrate supported on the calcined product in an amount of 5% by weight, calculated in terms of copper metal, based on the dealkalized mordenite and aluminum trifluoride components, followed by drying at 120–150° C. for 8 hours and calcining at 500° C. for 8 hours.

By employing 21.8 g. of the so obtained catalyst, the disproportionation of toluene was performed for 8 hours at a reaction pressure of 30 kg./cm.$^2$, a reaction temperature of 450° C., a hydrogen feed rate of 97 N–l./hr., a toluene feed rate of 20.1 g./hr., a hydrogen-to-toluene mol ratio of 20 and a time factor $W/F$ of 100 g. cat. hr./mol toluene. The conversion of toluene to benzene and xylene was 41–42 mol percent, the relative ringloss being 26 and the catalysis index being 4.0.

EXAMPLE 6

A catalyst was prepared in the same manner as in the case of the preparation of the catalyst of Example 5 except employing an aluminum trifluoride having a crystallite size of 250 A. instead of the aluminum trifluoride having a crystallite size of 1000 A., and using instead of the aqueous solution of copper nitrate an aqueous solution of silver nitrate to have silver nitrate supported on the catalyst in an amount of 3% by weight, calculated in terms of silver metal, based on the dealkalized mordenite and aluminum trifluoride components. When the disproportionation of toluene was carried out under the same conditions as in Example 5 by employing the so prepared catalyst, the conversion of toluene to benzene and xylene was 47–48 mol percent, the relative ringloss being 20 and the catalysis index being 7.3.

When the reaction was continued for 20 days by employing the above catalyst while the regeneration thereof was repeated, there was hardly observed any lowering of the catalysis index.

Further, when the disproportionation was performed by employing the above catalyst under the same conditions as above except that the reaction temperature was adjusted to 380° C., the conversion of toluene to benzene and xylene was 38–40 mol. percent.

EXAMPLE 7

A natural mordenite (produced in Miyagi prefecture, Japan) was pulverized to particles of less than 100 meshes and treated for 2 days with a 10% aqueous solution of ammonium nitrate at 90–100° C., following which the so treated mordenite was dried at 120–150° C. for 8 hours to obtain a dealkalized mordenite having a dealkalization degree of 94 mol percent. A basic aluminum fluoride [Al(OH)$_{1.1}$F$_{0.9}$O$_{0.5}$] having a crystallite size of 700 A. was mixed with the so dealkalized mordenite in an amount of 30% by weight based on the total weight. The mixture was shaped into pellets of 5 x 5 mm. $\phi$ and calcined at 500° C. for 8 hours. The calcined product was dipped into a 3 weight percent aqueous solution of silver nitrate to have silver nitrate supported on the calcined product in an amount of 3% by weight, calculated in terms of silver metal, based on the dealkalized mordenite and basic aluminum fluoride components, followed by drying at 120–150° C. for 8 hours and calcining at 500° C. for 8 hours.

When by employing 21.8 g. of the so obtained catalyst the disproportionation of toluene was carried out for 8 hours at a reaction pressure of 30 kg./cm.$^2$, a reaction temperature of 450° C., a hydrogen feed rate of 97 N–l/hr., a toluene feed rate of 20.1 g./hr., a hydrogen-to-toluene mol ratio of 20 and a time factor $W/F$ of 100 g. cat. hr./mol toluene, the conversion of toluene to benzene and xylene was 37–38 mol percent, the ringloss being 30 and the catalysis index being 3.1.

Control 5

Control catalysts were prepared in the same manner as in the case of the preparation of the catalyst of Example 6 except using no aluminum fluoride component or using instead of the aluminum fluoride component cadmium fluoride and manganese fluoride, respectively. By employing the so prepared control catalysts, respectively, the disproportionation of toluene was conducted under the same conditions as in Example 6. The results are shown in Table 5 below.

TABLE 5

| | Conversion of toluene to benzene and xylene (mol percent) | Relative ringloss |
|---|---|---|
| Fluoride: | | |
| Cadmium fluoride | 35–36 | 180 |
| Manganese fluoride | 12–13 | 39 |
| Not added | 44–45 | 117 |

Control 6

When the disproportionation of toluene was carried out under the same conditions as in Example 1 by employing a catalyst prepared in the same manner as in the case of the preparation of the catalyst A of Example 1 except that a natural mordenite produced in Miyagi prefecture and an aluminum trifluoride having a crystallite size of 2300 A. were used as the mordenite component and the aluminum fluoride component, respectively, the conversion of toluene to benzene and xylene was 35–36 mol percent, the relative ringloss being 120 and the catalysis index being 0.7.

Control 7

When the disproportionation of toluene was carried out under the same conditions as in Example 6 by employing a catalyst prepared in the same manner as in the case of the preparation of the catalyst of Example 6 except that an aluminum trifluoride having a crystallite size of 2200 A. was used instead of the aluminum trifluoride having a crystallite size of 250 A., the conversion of toluene to benzene and xylene was 39–40 mol percent, the relative ringloss being 119 and the catalysis index being 0.8.

What we claim is:

1. A process for the preparation of benzene and xylene by the disproportionation of toluene comprising contacting toluene with a catalytic amount of a catalyst under heating, characterized in that the catalyst is prepared by mixing a dealkalized mordenite with an aluminum fluoride, the said aluminum trifluoride having a crystallite size of less than 1700 A. before the mixing for the preparation of the catalyst, and that the said disproportionation is carried out in the presence of hydrogen.

2. The process in accordance with claim 1, wherein the catalyst comprises 20 to 99% by weight, based on the total weight of the catalyst, of the dealkalized mordenite and 1 to 80% by weight, based on the total weight of the catalyst, of the aluminum fluoride.

3. The process in accordance with claim 1, wherein the catalyst comprises 40 to 90% by weight, based on the total weight of the catalyst, of the dealkalized mordenite and 10 to 60% by weight, based on the total weight of the catalyst, of the aluminum fluoride.

4. The process in accordance with claim 1, wherein the dealkalized mordenite is prepared by substituting at least 50 mol percent of alkali metals and alkaline earth metals contained in the starting mordenite by hydrogen.

5. The process in accordance with claim 1, wherein the aluminum fluoride is an aluminum trifluoride hydrate.

6. The process in accordance with claim 1, wherein toluene is contacted with the catalyst at a temperature of from 300 to 700° C.

7. The process in accordance with claim 6, wherein hydrogen is made present in the system at a hydrogen-to-toluene mol ratio ranging from 10 to 20.

8. The process in accordance with claim 7, wherein the contact of toluene with the catalyst is conducted at a time factor $W/F$ of from 50 to 400 (g. cat. hr./mol toluene).

9. A process for the preparation of benzene and xylene by the disproportionation of toluene comprising contacting toluene with a catalytic amount of a catalyst under heating, characterized in that the catalyst is prepared by mixing a dealkalized mordenite and an aluminum trifluoride with at least one member selected from the group consisting of copper and silver, the said aluminum fluoride having a crystallite size of less than 1700 A. before the mixing for the preparation of the catalyst, and that the said disproportionation is carried out in the presence of hydrogen.

10. The process in accordance with claim 9, wherein the catalyst comprises 20 to 99% of the dealkalized mordenite, 1 to 80% of the aluminum fluoride and 0.05 to 30% of at least one group selected from the group consisting of copper and silver, all the percentages being by weight based on the weight of the dealkalized mordenite and aluminum fluoride components.

11. The process in accordance with claim 9, wherein the catalyst comprises 40 to 90% of the dealkalized mordenite, 10 to 60% of the aluminum fluoride and 5 to 10% of copper, all the percentage being by weight based on the weight of the dealkalized mordenite and aluminum fluoride components.

12. The process in accordance with claim 9, wherein the catalyst comprises 40 to 90% of the dealkalized mordenite, 10 to 60% of the aluminum fluoride and 2 to 8% of silver, all the percentage being by weight based on the weight of the dealkalized mordenite and aluminum fluoride components.

13. The process in accordance with claim 9, wherein the dealkalized mordenite is prepared by substituting at least 50 mol percent of alkali metals and alkaline earth metals contained in the starting mordenite by hydrogen.

14. The process in accordance with claim 9, wherein the aluminum fluoride is an aluminum trifluoride hydrate.

15. The process in accordance with claim 9, wherein toluene is contacted with the catalyst at a temperature of from 300 to 700° C.

16. The process in accordance with claim 15, wherein hydrogen is made present in the system at a hydrogen-to-toluene mol ratio ranging from 10 to 20.

17. The process in accordance with claim 16, wherein the contact of toluene with the catalyst is conducted at a time factor $W/F$ of from 50 to 400 (g. cat. hr./mol toluene).

References Cited

UNITED STATES PATENTS

| 3,354,078 | 11/1967 | Miale et al. | 208—120 |
| 3,413,374 | 11/1968 | Sato et al. | 260—672 |
| 3,477,964 | 11/1969 | Fishel | 252—442 |

DELBERT E. GANTZ, Primary Examiner

G. E. SCHMITKONS, Assistant Examiner

U.S. Cl. X.R.

252—442, 455

UNITED STATES PATENT OFFICE
CERTIFICATE OF CORRECTION

Patent No. 3,553,277      Dated January 5, 1971

Inventor(s) MASAKI SATO ET AL.

It is certified that error appears in the above-identified patent and that said Letters Patent are hereby corrected as shown below:

Claim 1, line 5, delete "fluo-" and insert therefor "trifl

Signed and sealed this 23rd day of March 1971.

(SEAL)
Attest:

EDWARD M. FLETCHER, JR.        WILLIAM E. SCHUYLER, JR
Attesting Officer               Commissioner of Patents